United States Patent
Norman, III (10) Patent No.: US 8,556,294 B1
(45) Date of Patent: Oct. 15, 2013

(54) AIRBAG INFLATOR

(75) Inventor: Kent Norman, III, St Petersburg, FL (US)

(73) Assignee: Key Safety Systems, Inc, Sterling Heights, MI (US)

( * ) Notice: Subject to any disclaimer, the term of this patent is extended or adjusted under 35 U.S.C. 154(b) by 0 days.

(21) Appl. No.: 13/591,298

(22) Filed: Aug. 22, 2012

(51) Int. Cl.
*B60R 21/263* (2011.01)
*B60R 21/264* (2006.01)

(52) U.S. Cl.
USPC .............................. 280/741; 280/736; 102/531

(58) Field of Classification Search
USPC ................... 280/741, 736, 740; 102/530, 531
See application file for complete search history.

(56) References Cited

U.S. PATENT DOCUMENTS

| | | | |
|---|---|---|---|
| 5,009,855 | A | 4/1991 | Nilsson |
| 5,622,380 | A | 4/1997 | Khandhadia et al. |
| 5,628,528 | A | 5/1997 | DeSautelle et al. |
| 6,032,979 | A | 3/2000 | Mossi et al. |
| 6,189,927 | B1 | 2/2001 | Mossi et al. |
| 6,199,906 | B1 | 3/2001 | Trevillyan et al. |
| 6,364,353 | B2 | 4/2002 | Green, Jr. et al. |
| 6,491,320 | B1 | 12/2002 | Nakashima et al. |
| 6,543,805 | B2 | 4/2003 | McFarland et al. |
| 6,547,275 | B2 | 4/2003 | Nakashima et al. |
| 6,598,901 | B2 | 7/2003 | Nakashima et al. |
| 6,701,849 | B2 | 3/2004 | McFarland et al. |
| 6,764,096 | B2 | 7/2004 | Quioc |
| 6,983,956 | B2 | 1/2006 | Canterberry et al. |
| 7,044,502 | B2 * | 5/2006 | Trevillyan et al. ............ 280/741 |
| 7,055,855 | B2 | 6/2006 | Nakashima et al. |
| 7,150,227 | B2 | 12/2006 | Matsuda |
| 7,347,448 | B2 | 3/2008 | Smith et al. |
| 7,350,810 | B2 | 4/2008 | Blessing et al. |
| 7,374,204 | B2 | 5/2008 | Hoffman et al. |
| 7,404,573 | B2 | 7/2008 | Nishimura et al. |
| 7,578,522 | B2 | 8/2009 | Hanano et al. |
| 7,726,687 | B2 | 6/2010 | Hoffman et al. |
| 7,883,111 | B2 | 2/2011 | Blessing et al. |
| 7,950,693 | B2 | 5/2011 | Jackson et al. |
| 7,954,848 | B2 | 6/2011 | Hayakawa et al. |
| 8,011,303 | B2 | 9/2011 | Nakayasu et al. |
| 8,047,569 | B2 | 11/2011 | Cox et al. |
| 8,444,179 | B2 * | 5/2013 | McFarland ..................... 280/736 |
| 2002/0050703 | A1 * | 5/2002 | Whang et al. ................. 280/737 |
| 2003/0146611 | A1 * | 8/2003 | Kenney et al. ................ 280/736 |
| 2006/0119087 | A1 * | 6/2006 | Blessing et al. .............. 280/736 |

FOREIGN PATENT DOCUMENTS

| | | |
|---|---|---|
| DE | 4005768 A1 | 8/1991 |
| DE | 102008028420 A1 | 12/2009 |
| JP | 3033792 U | 11/1996 |
| JP | 11-91495 A | 4/1999 |
| JP | 11-157412 A | 6/1999 |

* cited by examiner

*Primary Examiner* — Ruth Ilan
(74) *Attorney, Agent, or Firm* — Markell Seitzman

(57) ABSTRACT

An airbag inflator has a primary igniter and a secondary igniter. The primary igniter ignites an ignition enhancer material, which in turn ignites a primary supply of a gas generant material in a first chamber. A secondary supply of the gas generant material is located in a second chamber that is closed and is not in contact with any ignition enhancer material. Activation of the secondary igniter does not ignite the secondary supply of gas generant material, but does cause the second chamber to be opened. Combustion products from the primary supply of gas generant material enter the chamber and ignite the secondary supply of the gas generant material.

20 Claims, 4 Drawing Sheets

AIRBAG INFLATOR

FIELD OF THE INVENTION

The present invention relates to an airbag inflator provided with two chambers containing gas generant material, but the gas generant material in only one of the chambers is associated with an ignition enhancer material ignited by an igniter.

BACKGROUND OF THE INVENTION

The motor vehicle market is ever evolving towards smaller, lighter, more efficient vehicles. In doing so all parts of a motor vehicle must be reduced in size and weight, including the vehicle occupant restraint systems. The current invention provides a dual stage driver's side airbag inflator having a size and weight that is smaller than prior art dual stage driver's side airbag inflators. A dual stage driver's side airbag inflator of the present invention provides these improvements using specialized component geometries and the way in which the components function.

DISCUSSION OF THE PRIOR ART

Airbag inflators that are provided with more than one combustion chamber and more than one igniter are well known, with some general examples of background art being disclosed in the following patent publications: U.S. Pat. No. 6,199,906 B1; U.S. Pat. No. 6,364,353 B2; U.S. Pat. No. 6,547,275 B2; U.S. Pat. No. 6,598,901 B2; U.S. Pat. No. 6,764,096 B2; U.S. Pat. No. 6,983,956 B2; U.S. Pat. No. 7,044,502 B2; U.S. Pat. No. 7,055,855 B2; U.S. Pat. No. 7,150,227 B2; U.S. Pat. No. 7,374,204 B2; U.S. Pat. No. 7,578,522 B2; U.S. Pat. No. 7,726,687 B2; U.S. Pat. No. 7,950,693 B2; U.S. Pat. No. 8,047,569 B2 DE 40 05 768 A1; AND DE 10 2008 028 420 A1.

U.S. Pat. No. 6,189,927 B1 discloses an airbag inflator wherein a first combustion chamber encloses a second combustion chamber, and an igniter is associated with each combustion chamber. Only the first, primary, combustion chamber contains an ignition enhancer tube. The gas generants in the combustion chambers are different from one another. The igniter in the secondary combustion chamber ignites the gas generant in the second combustion chamber, and then generated pressure deforms the container of the second combustion chamber to allow generated gas to escape from the secondary combustion chamber. That is to say, a cap of the secondary container is displaced from the sidewall of the container to create a passageway. In contrast, in the airbag inflator of the present invention the gas generant in the secondary chamber is not ignited by the igniter associated with the secondary chamber.

U.S. Pat. No. 8,011,303 B2 discloses an airbag inflator with a structure similar to that disclosed in U.S. Pat. No. 6,189,927 B1, but instead of a cap of the secondary chamber being displace, the secondary igniter ignites generant in the secondary chamber and pressure causes tape located over ports in the chamber structure to be ruptured and gas generated in the secondary chamber enters the primary chamber.

Airbag inflator structures similar to that disclosed in U.S. Pat. No. 6,189,927 B1 are disclosed in other patents, namely U.S. Pat. No. 7,833,111 B2 and U.S. Pat. No. 7,404,573 B2. The airbag inflators disclosed in these patents have both the primary and secondary generant charges ignited by separate igniters associated with those charges.

U.S. Pat. No. 5,009,855 discloses an airbag inflator having a wall inside a housing that separates a gas generant material into two portions using a wall. There is a gap in the wall and after the first portion of gas generant is ignited gas from the first portion goes through the gap and ignites the second portion of gas generant. There is no real controlled staging of the generant burns. DE 40 05 768 A1 discloses an airbag inflator similar to the one disclosed in U.S. Pat. No. 5,009,855, having two combustion chambers that communicate through a narrow passageway, only one igniter, and hot gas from the first chamber ignites the gas generant in the second chamber.

Another means of igniting a generant material in a secondary chamber is the use of "sympathetic ignition" wherein heat from burning a primary quantity of gas generant is used to ignite a secondary quantity of gas generant in a second chamber using heat conducted through a wall separating the two chambers. This technique is disclosed in U.S. Pat. Nos. 5,622,380 and 5,628,528. U.S. Pat. No. 7,954,848 B2 discloses an airbag inflator having two combustion chambers disposed one above the other and separated by a partition wall. Only gas generant located in the lower chamber is ignited by an igniter. The burning of the gas generant in the lower chamber burns through the partition wall and ignites the gas generant in the upper chamber. JP 11-157412 discloses an airbag inflator with a similar structure but gas from burning generant in an upper chamber burns through a partition with areas designed to open due to the heat and then ignites generant in the lower chamber. JP 11091495 discloses a similar airbag inflator.

JP 3033792 discloses an airbag inflator with upper and lower chambers separated by a mesh filter. First the gas generant in the upper chamber is ignited, then hot gas travels through the mesh and ignites generant located in the lower chamber.

An airbag inflator of the present invention may be provided with a secondary combustion chamber may have a shape that is not a circular cross section. U.S. Pat. No. 7,350,810 B2 shows in figure two an airbag inflator with two combustion chambers, neither of which has a circular cross section. U.S. Pat. No. 6,543,805 B2 and U.S. Pat. No. 6,701,849 B2 each show in FIG. 3 a secondary combustion chamber that is kidney shaped in cross section.

SUMMARY OF THE INVENTION

There is provided in accordance with the present invention an airbag inflator that has a primary igniter and a secondary igniter. The primary igniter ignites an ignition enhancer material, which in turn ignites a primary supply of a gas generant material in a first chamber. A secondary supply of a gas generant material is located in a second chamber that is closed and is not in communication with any ignition enhancer material. Activation of the secondary igniter does not ignite the secondary supply of gas generant material, but does cause the second chamber to be opened. Combustion products from the primary supply of gas generant material enter the chamber and ignite the secondary supply of the gas generant material.

DETAILED DESCRIPTION OF THE INVENTION

Figure 1:
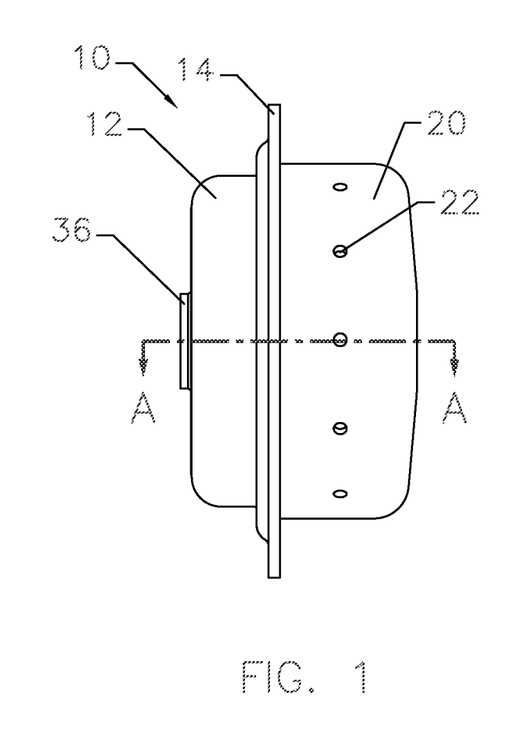
FIG. 1 is a side view of an airbag inflator according to the present invention.

Referring first to FIG. 1 there is shown side view of an airbag inflator 10 according to the present invention. This airbag inflator is primarily intended for use in inflating and deploying an airbag from a steering wheel to protect the driver of a motor vehicle in the event of a crash. However, it is understood that an airbag inflator of the present invention may be used at any appropriate location in a motor vehicle with any appropriate vehicle occupant protection device selected in accordance with good engineering practices. The airbag inflator has a cup shaped lower housing 12 provided with a mounting flange 14. It is understood that the mounting flange is optional and that an airbag inflator of the present invention may by incorporated in a motor vehicle using any suitable means for attachment selected in accordance with good engineering practices. The lower housing 12 is fixed to a cup shaped upper housing 20. The lower and upper housings 12, 20 are made of a metal, most commonly steel, but could comprise any suitable material selected in accordance with good engineering practices. The assembly of the lower and upper housings is referred to herein and the claims as being the "inflator housing" of an airbag inflator of the present invention.

Figure 3:
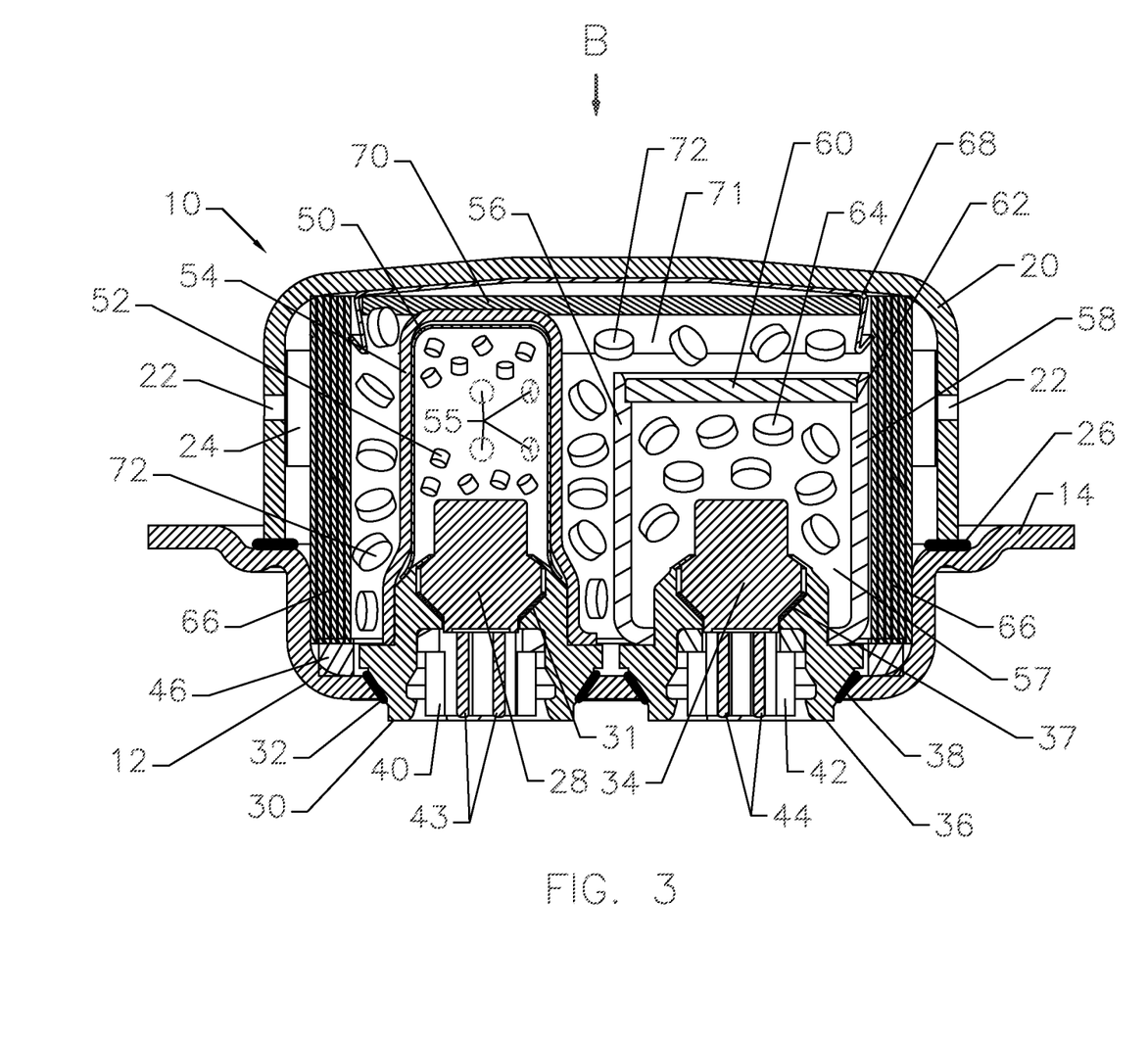
FIG. 3 is a section view of the airbag inflator of FIG. 1 taken at section line A-A of FIG. 1 looking in the direction indicated by the arrows.

As used herein and in the claims the terms "upper", "above", "higher" and similar terms are understood to refer to relative locations of components of an airbag inflator of the present invention as shown in FIG. 3 when the airbag inflator is in its intended operative orientation wherein the "upper housing" is proximal to a vehicle occupant who is to be protected by an airbag intended to be inflated or deployed by the operation of the airbag inflator. As used herein and in the claims the terms "lower", "below" and similar terms are understood to refer to relative locations of components of an airbag inflator of the present invention as shown in FIG. 3 when the airbag inflator is in its intended operative orientation wherein the "lower housing" is distal from a vehicle occupant who is to be protected by an airbag intended to be inflated or deployed by the operation of the airbag inflator.

Figure 2:
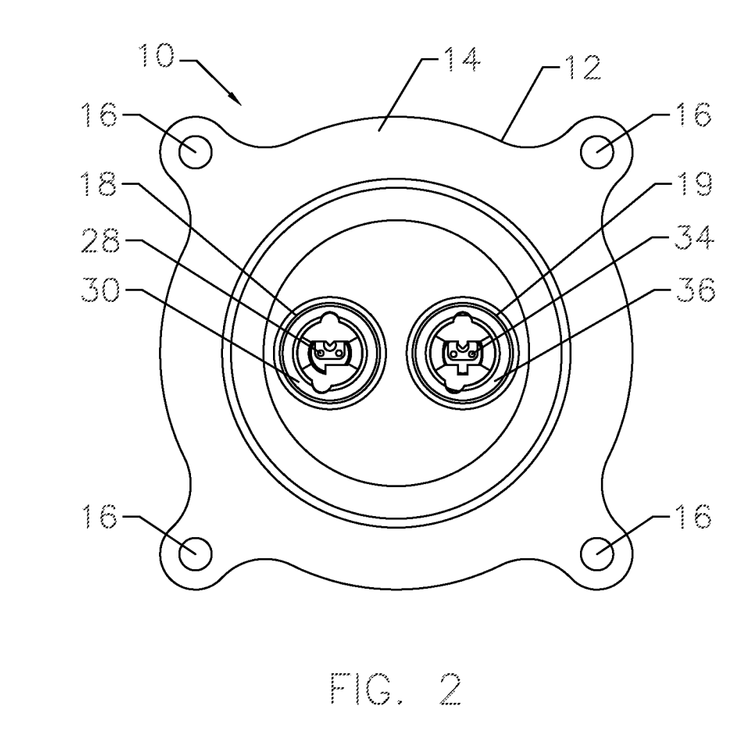
FIG. 2 is a bottom view of the airbag inflator of FIG. 1.

Referring next to FIG. 2 there is shown a bottom view of the airbag inflator 10 of FIG. 1. The mounting flange 14 that extends around the lower housing 12 is provided with a plurality of through holes 16 to accommodate fasteners (not shown) used for fixing the airbag inflator 10 to a motor vehicle. The configuration of the mounting flange 14 is of course merely exemplary since the mounting flange may be adapted to be compatible with the structure of any motor vehicle. The cup shaped lower housing 12 is provided with two through holes 18, 19 for receiving igniter retainers 30, 36 associated with primary and secondary igniters 28, 34.

Referring next to FIG. 3 there is shown a section view of the airbag inflator 10 of FIG. 1 taken at section line A-A of FIG. 1 looking in the direction indicated by the arrows. The cup shaped upper housing 20 is attached to the cup shaped lower housing 12 in the region of the mounting flange 14 by a weld 26, such as a friction weld or any other suitable method of attachment. An assembly of an igniter retainer 30 and a primary igniter 28 that is secured to the igniter retainer by crimping extends through a hole 18 (also shown in FIG. 1) in the base of the cup shaped lower housing and the igniter retainer 30 is secured to the lower housing by a weld 32, that is preferably a resistance weld or any other suitable method of attachment. A sealing washer 31 is interposed between the primary igniter and the igniter retainer to contribute to the hermetic sealing of the airbag inflator. An assembly of an igniter retainer 36 and a secondary igniter 34 that is secured to the igniter retainer by crimping extends through a hole 19 (also shown in FIG. 1) in the base of the cup shaped lower housing and the igniter retainer 36 is secured to the lower housing by a weld 38, that is preferably a resistance weld. A sealing washer 37 is interposed between the secondary igniter and the igniter retainer to contribute to the hermetic sealing of the airbag inflator. Each of the igniter retainers 30, 36 is provided with a shorting clip 40, 42 to prevent unintended activation of the associated igniter 28, 34. The primary igniter 28 and the secondary igniter 34 are each provided with connecting pins 43, 44 for mating to connectors (not shown) that communicate with electrical conductors (not shown) that provide power to the igniters when an electronic control unit (not shown) determines that a vehicle crash is occurring and that a particular igniter should be activated. Alternatively, the igniter/retainer assembly may be replaced by a singular unit that is molded from an appropriate material, such as a ceramic or glass filled nylon.

Figure 4:
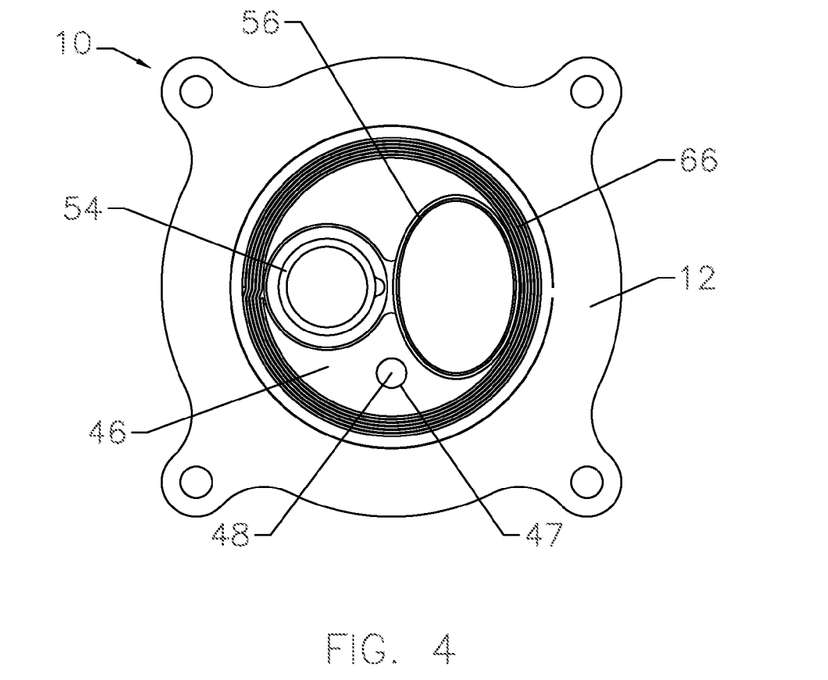
FIG. 4 is a view of the airbag inflator with the upper housing and filter retainer removed looking in the direction of arrow B in FIG. 3.

A lower cushion 46, shown in FIGS. 3 and 4, made of fiberglass mat is located in the lower housing 12, configured to fit around the igniter retainers. The lower cushion functions to abate noise caused by interaction of various components of the airbag inflator, such as pellets or tablets of a gas generant material, with metal components of the airbag inflator when the airbag inflator is installed in a motor vehicle that is in motion. A recess 47 in the lower cushion 46 receives a pellet 48 comprised of an autoignition material. An autoignition material is one that will ignite at a selected temperature, specifically during a vehicle fire, and cause the gas generant material in the airbag inflator to ignite.

A relatively thin metal cup 50 containing an ignition enhancer compound 52 is fitted into an ignition enhancer combustion chamber housing 54 of a thicker metal. The ignition enhancer combustion chamber housing is provided with through holes 55 to allow the passage of the products produced by the burning ignition enhancer compound 52 to pass therethrough. The ignition enhancer combustion chamber housing is fitted over the primary igniter 28 and the associated igniter retainer 30 and is secured in place by a strong interference fit with the igniter retainer. If the ignition enhancer compound 52 is in the form of a granules or powder that could pass through the holes 55 in the ignition enhancer combustion chamber housing 54 the thin metal cup 50 is necessary to retain the ignition enhancer compound 52 inside the ignition enhancer combustion chamber housing 54. However, if the ignition enhancer compound is provided in the form of pellets, tablets, or any other suitable form of a size too large to pass through the holes 55 in the ignition enhancer combustion chamber housing 54 the thin metal cup 50 may be eliminated.

A housing 56 for containing a secondary supply of a gas generant material 64 disposed in a chamber 57 is fitted over the secondary igniter 34 and the associated igniter retainer 36 and secured in place by a strong interference fit with the igniter retainer. The housing 56 for containing a secondary supply of a gas generant material comprises a sidewall member 58 and a closure 60 that is disposed adjacent a ledge 62 on the interior of the sidewall member 58. The closure 60 is fitted to the sidewall member with a relatively light interference fit that will both isolate the secondary supply of gas generant from sympathetic ignition, and that will facilitate movement of the closure away from the sidewall member during the operation of the airbag inflator in a manner that is described below. It is understood that while it is preferable that the chemical composition of the primary and secondary supplies of gas generant material 64, 72 are the same, this is not believed to be a requirement of the airbag inflator of the present invention. The chemical and physical properties and/or geometry of the pellets, tablets, or any other suitable form of the primary and secondary supplies of gas generant material may be the same or different to allow tailoring of the performance of an airbag inflator of the present invention as required for any application.

A metal foil 24 is located inside and attached to the upper housing 20 overlying the gas exit ports 22 through the upper housing. An annular filter 66, preferably made of multiple layers of perforated expandable metal, surrounds the interior of the airbag inflator. However, it is understood that the annular filter may comprise any suitable material including discontinuous metal fibers compressed to provide a mesh. The annular filter helps to define a combustion chamber and is intended to prevent particulate materials that are products of the combustion of the gas generant material from exiting the airbag inflator. The annular filter further acts as a heat sink to cool the gas that is a product of the combustion of the gas generant material as the gas passes through the annular filter to exit the upper housing 20 through the gas exit ports 22.

An upper cushion 70 made of a fiberglass mat and a thin metal pellet retainer 68 overlies the interior space occupied by the primary supply 72 of a gas generant material. As shown in FIG. 3 the upper cushion is configured to fit within the retainer, and the retainer to fit within the annular filter 66. However it is understood that the relative sizes of the components of an airbag inflator of the present invention may be adapted to accommodate any suitable motor vehicle, and the exact locations of components such as the upper cushion may be altered without deviating from the scope of the present invention as it is disclosed and claimed herein. The retainer 68 also functions as a seal to prevent leakage around the end of the filter during combustion. The upper cushion functions to abate noise caused by interaction of various components of the airbag inflator, such as pellets or tablets of a gas generant material with metal components of the airbag inflator, when the airbag inflator is installed in a motor vehicle that is in motion. The cup shaped upper housing 20 encloses the annular filter 66 and the retainer 68 and is secured to the cup shaped lower housing 12 by a weld 26.

A primary supply of a gas generant material 72 is disposed in an interior space 71, also referred to herein as a primary combustion chamber, bounded by the annular filter 66, the lower cushion 46 (supported by the lower housing 12), the upper cushion 29 (supported by the retainer 68), the ignition enhancer combustion chamber housing 54 and the housing 56 for containing a secondary supply of a gas generant material (including both the sidewall member 58 and closure 60).

Referring again to FIG. 4 there is shown is a view of the airbag inflator 10 with the upper housing, pellet retainer and upper cushion removed looking in the direction of arrow B in FIG. 3. The annular filter 66 is shown located inside the cup shaped lower housing 12 extending circumferentially around the ignition enhancer combustion chamber housing 54 and the housing 56 for containing a secondary supply of a gas generant material. The ignition enhancer combustion chamber housing 54 is shown to have a substantially circular cross section. However the housing 56 for containing a secondary supply of a gas generant material has a cross section that is not circular. In this embodiment the housing 56 for containing a secondary supply of a gas generant material has a cross section that is substantially elliptical, with the minor axis of the ellipse aligned with a radius of the ignition enhancer combustion chamber housing 54 to allow the diameter of the cup shaped lower housing to be reduced over what it would be if the housing 56 for containing a secondary supply of a gas generant material were circular in cross section and contained the same volume of gas generant material as the elliptical housing shown in FIG. 4. An airbag inflator of the present invention is intended to have a smaller outside diameter of the lower and upper housing members than conventional airbag inflators employed with the steering wheels of motor vehicles.

Figure 5:
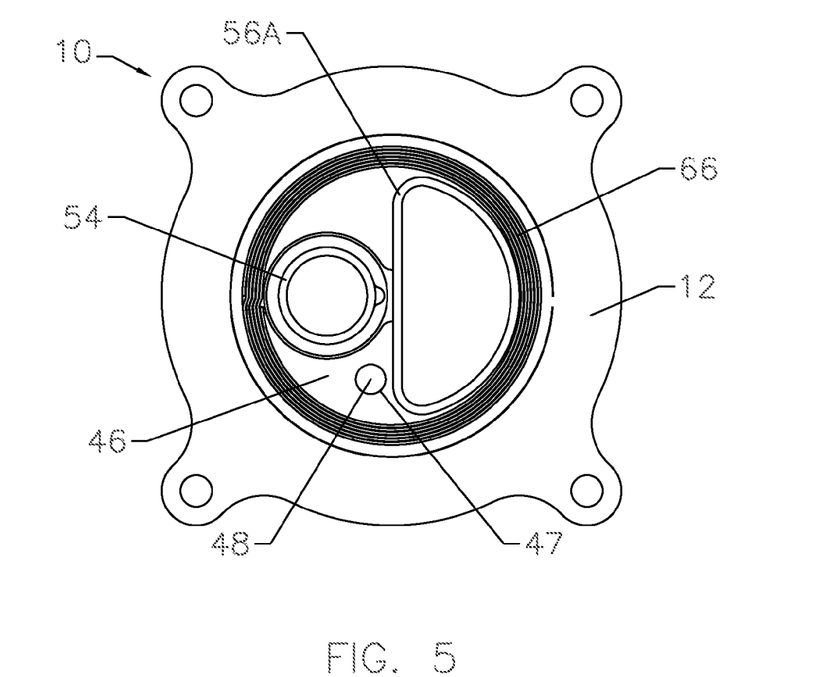
FIG. 5 is a view of an alternative embodiment of the airbag inflator with the upper housing and filter retainer removed looking in the direction of arrow B in FIG. 3.

Referring to FIG. 5 there is shown a view of an alternative embodiment of the airbag inflator 10 with the upper housing and filter retainer removed looking in the direction of arrow B in FIG. 3. This embodiment is substantially like the above described embodiment with the lower housing 12 supporting an annular filter 66 that extends around an ignition enhancer combustion chamber housing 54 that is shown to have a substantially circular cross section. In this alternative embodiment the housing 56A for containing a secondary supply of a gas generant material again has a cross section that is not circular. In this alternative embodiment the housing 56 for containing a secondary supply of a gas generant material has a cross section that is substantially semi circular with a radius of the semicircle aligned with a radius of the ignition enhancer combustion chamber housing 54 to allow the diameter of the cup shaped lower housing to be reduced over what it would be if the housing 56A for containing a secondary supply of a gas generant material were circular in cross section and contained the same volume of gas generant material as the semicircular housing shown in FIG. 5.

Figure 6A:
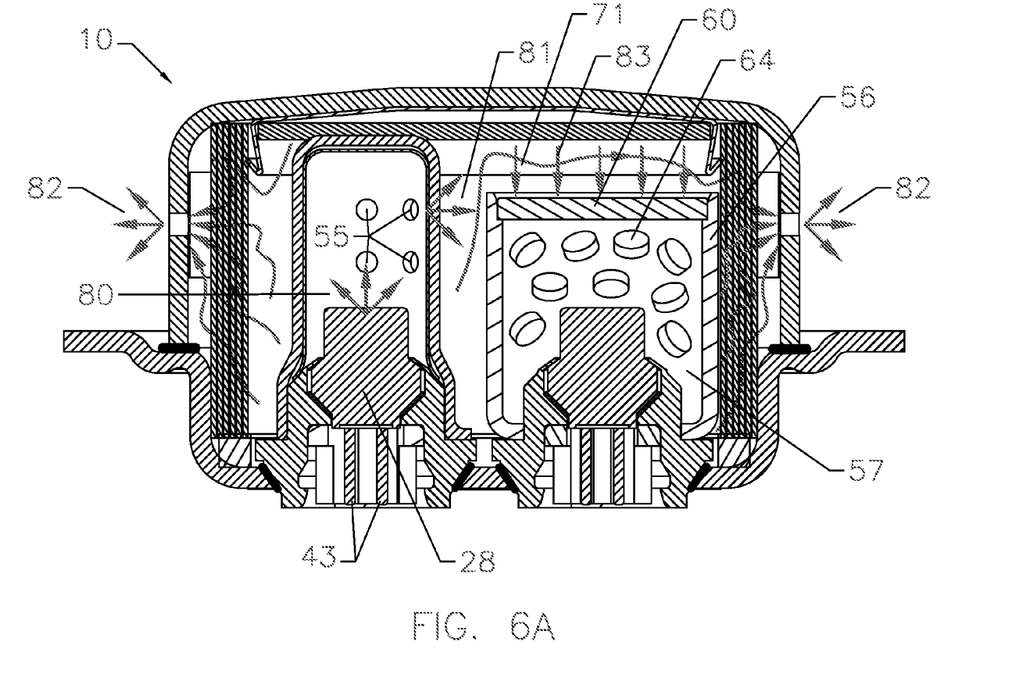
FIGS. 6A and 6B are cross sections of the airbag inflator illustrating the operation of the airbag inflator.
Figure 6B:
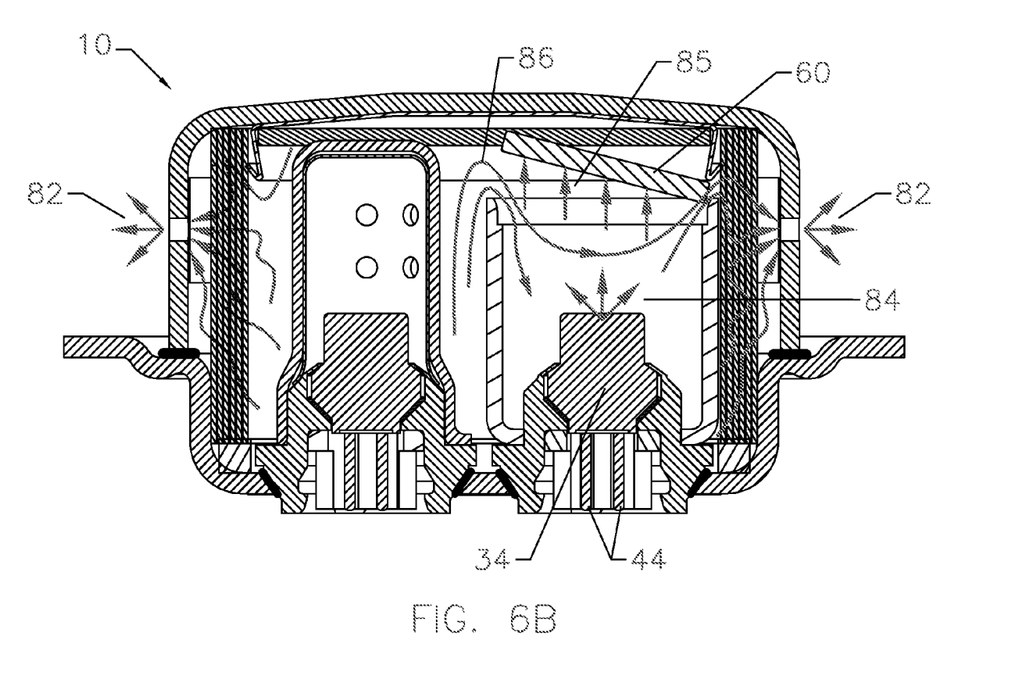

The operation of an airbag inflator of the present invention can be understood with reference to the foregoing text along with FIGS. 6A and 6B which are cross sections of the airbag inflator illustrating the operation of the inflator. When an airbag inflator 10 of the present invention is installed in a motor vehicle, for instance in a steering mechanism, the connecting pins 43 of the primary igniter 28, and the connecting pins 44 of the secondary igniter 34 are in circuit communication with an electronic control unit (not shown) via suitable electrical conductors (not shown). The electronic control unit is programmed to receive a signal from a crash sensor when the crash sensor senses rapid deceleration of the motor vehicle indicative of the occurrence of a crash. The electronic control unit is programmed to analyze a number of data inputs that can include not only the occurrence of a crash, but for example: the severity of a crash; the presence or absence of a vehicle occupant at a particular location in the vehicle; the size of a vehicle occupant; the distance of a vehicle occupant from an airbag module; and so forth. Of course the crash sensor and the electronic control module are adapted for use with the motor vehicle in which they and the airbag inflator, and other components of an airbag module are installed.

FIG. 6A is a schematic representation of the airbag inflator after the primary igniter has been activated and the ignition enhancer material and primary supply of gas generant material are burning. FIG. 3 should be referred to along with FIG. 6A. When the electronic control unit determines that a vehicle crash is being experienced an electronic current is sent to the connecting pins 43 of the primary igniter 28 causing the primary igniter to be activated and generate heat as indicated by arrows 80 in FIG. 6A. The heat generated by the primary igniter causes the ignition and combustion of the ignition enhancer material 52 located inside the ignition enhancer combustion chamber housing 54 and the thin metal cup 50 that lines the inside of the ignition enhancer combustion chamber housing. The gas generant material that makes up the primary supply of gas generant material 72 and the secondary supply of gas generant material 64 cannot be ignited by only the heat generated by the primary and secondary igniters 28, 34. The primary igniter 28 is able to ignite the igniter enhancer material 52 which produces products of combustion in the form or hot gas and particulates that penetrate the thin metal cup 50 and exit the ignition enhancer combustion chamber housing 54 through the holes 55 in the ignition enhancer combustion chamber housing as indicated by arrows 81 in FIG. 6A. The hot gas and particulates produced by the burning of the ignition enhancer material then cause the ignition and combustion of the primary supply of gas generant material 72 in the primary combustion chamber 71. The products of combustion of the primary supply of gas generant material include hot gas and particulates. The hot gas passes through the annular filter 66, while at least most of the particulate are blocked by the annular filter. The hot gas penetrates the metal foil 24 and exits the housing of the airbag inflator via the gas exit ports 22 in the upper housing 20 as indicated by arrows 82 in FIG. 6A. The hot gas exerts pressure on the closure 60 of the housing 56 for the secondary supply of gas generant material 64. As shown in FIG. 6A, the closure 60 is urged downward, as indicated by arrows 83, against the ledge 62 of the sidewall member 58, preventing hot gas and particulates produced by the burning of the primary supply of gas generant material from contacting the secondary supply of gas generant material 64. The thickness and heat transfer properties of the sidewall member 58 and closure 60 of the housing 56 containing the secondary supply of gas generant material prevent sympathetic ignition of the secondary supply of gas generant material.

The electronic control unit makes a decision as to whether or not the combustion products of the secondary supply of gas generant material should be provided to a vehicle occupant restraint member, such as a driver side airbag, to protect a vehicle occupant. The electronic control unit makes this decision based upon sensed data such as the proximity of the vehicle driver to the steering wheel, the size of the vehicle driver, the severity of the crash, and whether or not the driver is restrained by a safety belt. It is intended that whenever an airbag inflator of the present invention is activated that both the primary and secondary igniters will be activated as will be described with reference to FIG. 6B which shows the inflator when the secondary supply of gas generant material is burning, and FIG. 3. If the decision is that the gas generated by burning the secondary supply of gas generant material is needed for proper deployment of the airbag the electronic control unit sends an electric current to the connecting pins 44 of the secondary igniter 34 within an appropriate time frame (ie twenty milliseconds) after the primary igniter was activated. As already discussed, the activation of the secondary igniter 34 alone, as indicated by arrows 84 in FIG. 6B, will not ignite the secondary supply of gas generant material 64. However the force of a small explosion that occurs when the secondary igniter is activated generates enough pressure, as indicated by arrows 85 in FIG. 6B, to cause the closure 60 of the housing 56 containing the secondary supply of gas generant material to be moved allowing hot gas and particulates produced by the burning of the primary supply of gas generant material to move into contact with the secondary supply of gas generant material as indicted by the arrows 86 in FIG. 6B. The secondary supply of gas generant material is thereby ignited and burns to produce gas and particulates. The gas passes through the annular filter 66 and exits the housing of the airbag inflator via the gas exit ports 22 in the upper housing 20 as indicated by arrows 82 in FIG. 6B. That is to say, when the secondary igniter is activated during the time frame when the airbag is being deployed, the volume of gas provided to the airbag is larger than that provided by the burning of only the primary supply of gas generant material.

If the decision of the electronic control unit is that the gas generated by burning the secondary supply of gas generant material is not needed for proper deployment of the airbag the electronic control unit delays sending an electric current to the connecting pins 44 of the secondary igniter 34 until about one hundred milliseconds after the primary igniter was activated. The deployment of an airbag during a crash event occurs very rapidly, a frontal airbag, such as one deployed from the steering mechanism of a motor vehicle, begins to deflate very rapidly, the airbag is fully inflated for only a few milliseconds during which the vehicle occupant may interface with the airbag. Even one hundred milliseconds after the activation of the primary igniter, and following the deployment of the airbag, there is sufficient heat remaining inside the inflator housing to ignite the secondary supply of gas generant. It is preferable that no unburned gas generant material remain in an airbag inflator after a crash because of the threat posed by the presence of gas generant material if the vehicle should catch fire as the result of the crash. The delayed burning of the secondary supply of gas generant material is necessary to alleviate such a threat.

It is understood that the invention is not limited to the particular construction and arrangement of parts herein illustrated and described, but embraces all such modified forms thereof as come within the scope of the following claims.

What is claimed is:

1. An airbag inflator comprising:
    an inflator housing defining an interior space and having a primary igniter and a secondary igniter fixed to the inflator housing, the primary igniter being partially disposed within an ignition enhancer combustion chamber housing located in the interior space of the inflator housing, the ignition enhancer combustion chamber housing containing an ignition enhancer material, the interior space of the inflator housing containing a primary supply of a gas generant material;
    the secondary igniter being partially disposed in a closed chamber inside a housing located in the interior space of the inflator housing, the closed chamber containing a secondary supply of a gas generant material, the secondary supply of the gas generant material being separated from the primary supply of the gas generant material, the closed chamber does not contain an ignition enhancer material;
    activation of the primary igniter causing ignition of the ignition enhancer material which produces hot gas and particulates that exit the ignition enhancer combustion chamber housing via holes through the ignition enhancer combustion chamber housing to cause ignition and combustion of the primary supply of a gas generant material;
    activation of the secondary igniter causing an opening to be created in the housing that defines the closed chamber located in the interior space of the inflator but not causing ignition of the secondary supply of a gas generant material, the secondary supply of a gas generant material being ignited by hot gas and particulates produced by the combustion of the primary supply of gas generant material; and
    the inflator housing is provided with gas exit ports that allow gas to escape from the interior space of the inflator housing.

2. The airbag inflator of claim 1 wherein the ignition enhancer combustion chamber housing has a circular cross section and the housing containing the secondary supply of the gas generant material has a cross section that is not circular.

3. The airbag inflator of claim 1 wherein the ignition enhancer combustion chamber housing has a circular cross section and the housing containing the secondary supply of the gas generant material has a cross section that is substantially elliptical, with the minor axis of the ellipse aligned with a radius of the ignition enhancer combustion chamber housing.

4. The airbag inflator of claim 1 wherein the ignition enhancer combustion chamber housing has a circular cross section and the housing containing the secondary supply of the gas generant material has a cross section that is substantially semicircular.

5. The airbag inflator of claim 1 wherein the housing containing the secondary supply of the gas generant comprises a sidewall member and a closure secured to the sidewall member, activation of the secondary igniter causing displacement of the closure to produce an opening in the housing containing the secondary supply of the gas generant.

6. The airbag inflator of claim 1 wherein the primary igniter is activated first and then after a delay the secondary igniter is activated.

7. The airbag inflator of claim 1 wherein the housing containing the secondary supply of the gas generant has a thickness and heat transfer properties that prevent the ignition of the secondary supply of the gas generant by sympathetic ignition so long as the housing containing the secondary supply of gas generant is not opened.

8. An airbag inflator comprising:
an inflator housing defining a first chamber which in a static state contains a first quantity of a gas generant material, the first chamber also containing a completely closed structure defining a second chamber which in a static state contains a second quantity of a gas generant material, the gas generant material being ignitable to produce combustion products including a gas for inflating an airbag;
a first igniter operatively associated with the first chamber, an enclosed structure having passages therethrough is associated with the first igniter and contains a quantity of an ignition enhancer material that is ignitable by the first igniter; whereby activation of the first igniter causes combustion of the ignition enhancer material which produces combustion products and heat that pass through the passages in the enclosed structure to ignite the first quantity of the gas generant material;
a second igniter operatively associated with the second chamber that does not contain an ignition enhancer material whereby activation of the second igniter does not cause ignition of the second quantity of gas generant material, activation of the second igniter does cause an increase in pressure inside the second chamber causing an opening in the closed structure;
wherein combustion products produced by combustion of the first quantity of the gas generant material enter the second chamber through the opening in the closed housing to ignite the second quantity of the gas generant material.

9. The airbag inflator of claim 8 wherein the primary igniter is activated first and then after a delay the secondary igniter is activated.

10. The airbag inflator of claim 8 wherein the structure containing the secondary supply of the gas generant has a thickness and heat transfer properties that prevent the ignition of the secondary supply of the gas generant by sympathetic ignition so long as the housing containing the secondary supply of gas generant is not opened.

11. The airbag inflator of claim 8 wherein the housing defining the first chamber has passages therethrough to allow the gas for inflating an airbag to exit from the airbag inflator.

12. The airbag inflator of claim 8 wherein the closed structure defining the second chamber has a cross section that is not circular.

13. The airbag inflator of claim 8 wherein the closed structure defining the second chamber has a cross section that is elliptical.

14. The airbag inflator of claim 8 wherein the closed structure defining the second chamber has a cross section that is substantially semicircular.

15. An airbag inflator comprising:
an inflator housing comprising a cup shaped lower housing and a cup shaped upper housing fixed to the lower housing, the upper housing having gas exit ports therethrough, and the inflator housing defining an interior space;
a lower side of the cup shaped lower housing is provided with two through holes for receiving igniter retainers associated with primary and secondary igniters,
the primary igniter being partially disposed within an ignition enhancer combustion chamber housing located in the interior space of the inflator housing and fixed to the igniter retainer associated with the primary igniter, the ignition enhancer combustion chamber housing containing an ignition enhancer material;
the secondary igniter being partially disposed in a closed chamber inside a housing located in the interior space of the inflator housing;
the interior space of the inflator housing containing a primary supply of a gas generant material, and the closed chamber containing a secondary supply of a gas generant material, the secondary supply of the gas generant material being separated from the primary supply of the gas generant material by the housing located in the interior space of the inflator housing, the closed chamber does not contain an ignition enhancer material;
activation of the primary igniter causing ignition of the ignition enhancer material which produces hot gas and particulates that exit the ignition enhancer combustion chamber housing via holes through the ignition enhancer combustion chamber housing to cause ignition and combustion of the primary supply of a gas generant material; and
following activation of the primary igniter the secondary igniter is activated causing an opening to be created in the housing that defines the closed chamber located in the interior space of the inflator but not causing ignition of the secondary supply of a gas generant material, the secondary supply of a gas generant material being ignited by hot gas and particulates produced by the combustion of the primary supply of gas generant material.

16. The airbag inflator of claim 15 wherein the ignition enhancer combustion chamber housing has a circular cross section and the housing containing the secondary supply of the gas generant material has a cross section that is not circular.

17. The airbag inflator of claim 15 wherein the ignition enhancer combustion chamber housing has a circular cross section and the housing containing the secondary supply of the gas generant material has a cross section that is substantially elliptical, with the minor axis of the ellipse aligned with a radius of the ignition enhancer combustion chamber housing.

18. The airbag inflator of claim 15 wherein the ignition enhancer combustion chamber housing has a circular cross section and the housing containing the secondary supply of the gas generant material has a cross section that is substantially semicircular.

19. The airbag inflator of claim 15 wherein the housing containing the secondary supply of the gas generant comprises a sidewall member and a closure secured to the sidewall member, activation of the secondary igniter causing displacement of the closure to produce an opening in the housing containing the secondary supply of the gas generant.

20. The airbag inflator of claim 15 wherein the housing containing the secondary supply of the gas generant has a thickness and heat transfer properties that prevent the ignition of the secondary supply of the gas generant by sympathetic ignition so long as the housing containing the secondary supply of gas generant is not opened.

\* \* \* \* \*